(12) United States Patent
Otsu

(10) Patent No.: US 8,913,155 B2
(45) Date of Patent: Dec. 16, 2014

(54) IMAGE FORMING OPTICAL SYSTEM, IMAGE PICKUP APPARATUS USING THE SAME, AND INFORMATION PROCESSING APPARATUS

(71) Applicant: Olympus Corporation, Tokyo (JP)

(72) Inventor: Takuya Otsu, Tokyo (JP)

(73) Assignee: Olympus Corporation, Tokyo (JP)

( * ) Notice: Subject to any disclaimer, the term of this patent is extended or adjusted under 35 U.S.C. 154(b) by 249 days.

(21) Appl. No.: 13/646,998

(22) Filed: Oct. 8, 2012

(65) Prior Publication Data

US 2013/0093938 A1    Apr. 18, 2013

(30) Foreign Application Priority Data

Oct. 14, 2011    (JP) .................. 2011-226697

(51) Int. Cl.
| | |
|---|---|
| *H04N 9/73* | (2006.01) |
| *H04N 5/222* | (2006.01) |
| *H04N 5/225* | (2006.01) |
| *G02B 9/60* | (2006.01) |
| *G02B 13/00* | (2006.01) |
| *H04N 5/232* | (2006.01) |

(52) U.S. Cl.
CPC ............. *G02B 9/60* (2013.01); *H04N 5/2254* (2013.01); *G02B 13/0045* (2013.01); *H04N 5/23212* (2013.01)

USPC ................... 348/224.1; 348/333.08; 348/340

(58) Field of Classification Search
None
See application file for complete search history.

(56) References Cited

U.S. PATENT DOCUMENTS

| | | | |
|---|---|---|---|
| 6,327,100 B1 * | 12/2001 | Yamanashi | ................... 359/689 |
| 8,072,695 B1 | 12/2011 | Lee et al. | |
| 2007/0229974 A1 * | 10/2007 | Shibayama et al. | .......... 359/686 |
| 2009/0161087 A1 * | 6/2009 | Ohmura | ......................... 355/67 |

FOREIGN PATENT DOCUMENTS

| | | |
|---|---|---|
| JP | 2010-237407 A | 10/2010 |
| JP | 2010-262270 A | 11/2010 |

\* cited by examiner

*Primary Examiner* — Aung S Moe
*Assistant Examiner* — Euel Cowan
(74) *Attorney, Agent, or Firm* — Brosemer, Kolefas & Associates, LLC

(57) ABSTRACT

An optical system includes, in order from the object side, an aperture, a first lens having a positive refractive power, a second lens having a negative refractive power, a third lens having a positive refractive power, a fourth lens having a positive refractive power and having a meniscus shape with a convex surface facing the image side, and a fifth lens having a negative refractive power. The optical system satisfies a certain condition.

14 Claims, 18 Drawing Sheets

IMAGE FORMING OPTICAL SYSTEM, IMAGE PICKUP APPARATUS USING THE SAME, AND INFORMATION PROCESSING APPARATUS

CROSS-REFERENCE TO RELATED APPLICATION

The present application is based upon and claims the benefit of priority from the prior Japanese Patent Application No. 2011-226697 filed on Oct. 14, 2011; the entire contents of which are incorporated herein by reference.

BACKGROUND OF THE INVENTION

1. Field of the Invention

The present invention relates to an image forming optical system, an image pickup apparatus using the same, and an information processing apparatus.

2. Description of the Related Art

With slimming of cellular phones, portable digital assistances, and notebook computers in these years, camera modules with an optical system having an extremely short length along the optical axis are demanded. Moreover, with a progress in the technology of image pickup elements and growing needs in the market, image pickup element with a large number of pixels are used, and taking lenses with high resolution are demanded.

To meets such demands, many single focal length optical system composed of five aspheric lenses have been developed.

Japanese Patent Application Laid-Open Nos. 2010-237407 and 2010-262270 disclose optical systems having five lenses that is short in overall optical length while having high image forming performance. The optical systems disclosed in these patent documents are composed of five aspheric lenses and having high performance.

SUMMARY OF THE INVENTION

An image forming optical system according to the present invention comprises, in order from the object side, an aperture, a first lens having a positive refractive power, a second lens having a negative refractive power, a third lens having a positive refractive power, a fourth lens having a positive refractive power and having a meniscus shape with a convex surface facing the image side, and a fifth lens having a negative refractive power, and the image forming optical system satisfying the following conditional expression (1):

$$0.55 < \phi s9/\phi s10 < 0.65 \quad (1),$$

where $\phi s9$ is the effective diameter of the fourth lens on its image side, and $\phi s10$ is the effective diameter of the fifth lens on its object side.

It is preferred that an image pickup apparatus according to the present invention comprise the above-described image forming optical system and an auto-focusing mechanism that are integrated together.

It is preferred that an image pickup apparatus according to the present invention comprise the above-described image forming optical system and an image pickup element that are integrated together.

An information processing apparatus according to the present invention comprises:

an input section used to operate the information processing apparatus;

a processing section that processes at least information from the input section;

the above-described image pickup apparatus that obtains image information based on information from the processing section;

an image processing section that processes the image information obtained by the image pickup apparatus; and a display section that displays the processed image.

BRIEF DESCRIPTION OF THE DRAWINGS

FIG. 15A is a front view of the cellular phone 400, FIG. 15B is a side view of the cellular phone 400, and FIG. 15C is across sectional view of the taking optical system 405;

DETAILED DESCRIPTION OF THE INVENTION

Figure 1:
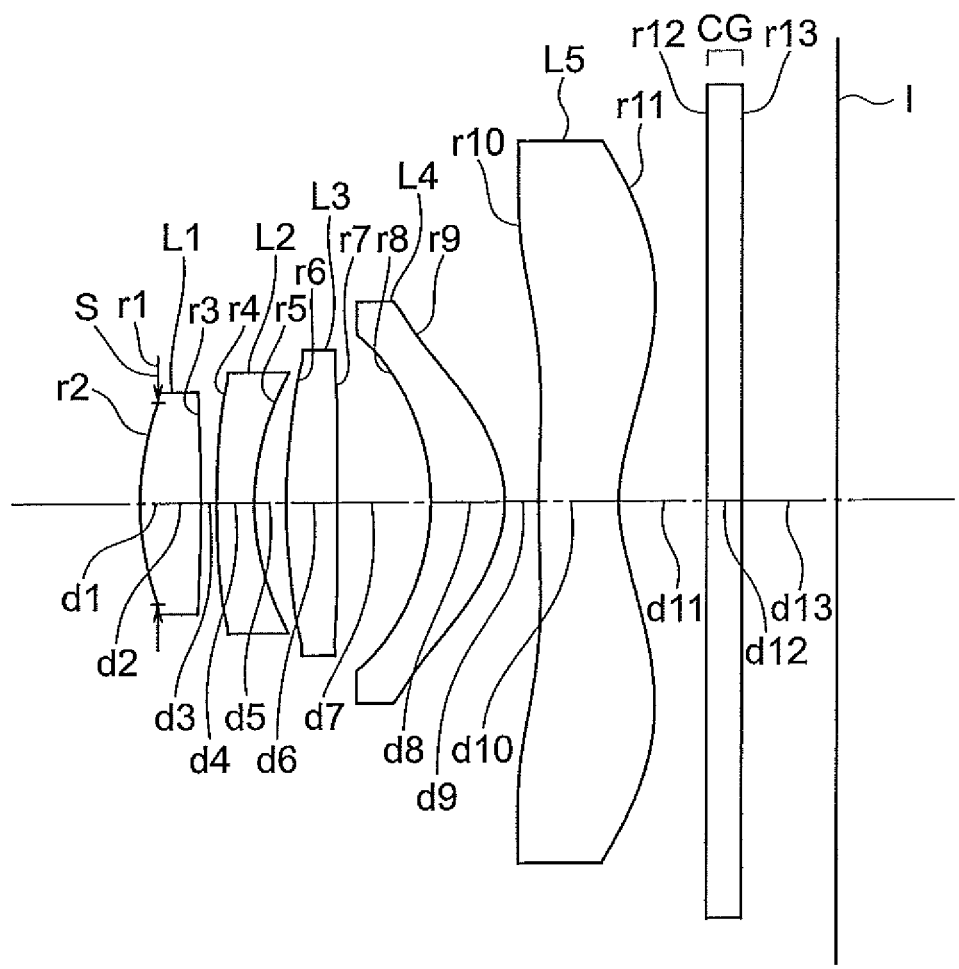
FIG. 1 is a cross sectional view taken along the optical axis, showing the optical configuration of a taking optical system according to a first embodiment of the present invention.
Figure 2:
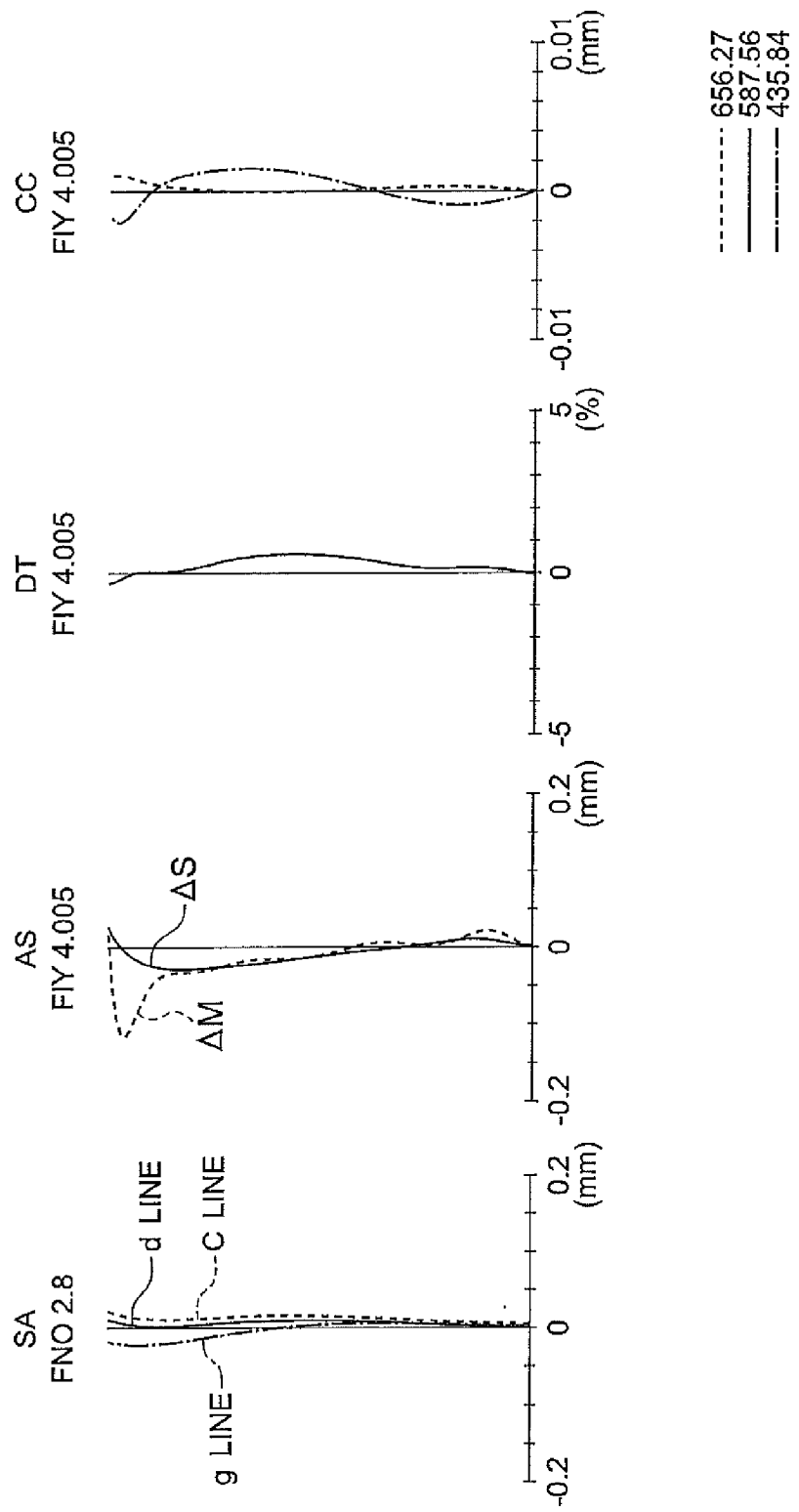
FIGS. 2A, 2B, 2C, and 2D respectively show spherical aberration (SA), astigmatism (AS), distortion (DT), and chromatic aberration of magnification (CC) of the taking optical system according to the first embodiment in the state in which the taking optical system is focused on an object point at infinity.

Prior to the description of embodiments, the operation and advantages of an image forming optical system according to a mode of the invention will be described.

An image forming optical system according to this mode includes, in order from the object side, an aperture, a first lens having a positive refractive power, a second lens having a negative refractive power, a third lens having a positive refractive power, a fourth lens having a positive refractive power and having a meniscus shape with a convex surface facing the image side, and a fifth lens having a negative refractive power, and the image forming optical system satisfying the following conditional expression (1):

$$0.55 < \phi s9/\phi s10 < 0.65 \quad (1),$$

where $\phi s9$ is the effective diameter of the fourth lens on its image side, and $\phi s10$ is the effective diameter of the fifth lens on its object side.

In the above configuration, the stop is disposed closest to the object side to make the exit pupil distant from the image plane. This enables to make the angle of rays incident on the peripheral region of the image pickup element small and makes it possible to reduce the optical length and to prevent a decrease in the sensitivity in the peripheral region of the image pickup element. Moreover, locating the position of the principal point on the object side of the optical system can lead to a sufficiently small overall length in relation to the focal length. In consequence, a reduction in the overall length can be achieved. Furthermore, with the five-lens configuration with a positive fourth lens, divergence of off-axis beams can be reduced by the fourth lens, and the diameter of the last lens can be made small while maintaining the telecentricity of the optical system.

Conditional expression (1) relates to the effective aperture of the fourth lens on its image side and the effective aperture of the fifth lens on its object side.

If the upper limit of conditional expression (1) is exceeded, the effective aperture of the four lens is so large that off-axis beams having a large angle of incidence on the fifth lens will be reflected and enter the fourth lens again to possibly cause ghost images.

If the lower limit of conditional expression (1) is not reached, the effective aperture of the fourth lens is so small that the exit angle of off-axis beams exiting from the fourth lens toward the fifth lens will become large, leading to difficulty in making the incidence angle on the sensor small.

It is more preferred that the following conditional expression (1') be satisfied instead of conditional expression (1):

$$0.57 < \phi s9/\phi s10 < 0.65 \quad (1').$$

It is still more preferred that the following conditional expression (1") be satisfied instead of conditional expression (1):

$$0.59 < \phi s9/\phi s10 < 0.63 \quad (1'').$$

In the image forming optical system according to this mode, it is preferred that the following conditional expression (2) be satisfied:

$$\phi s9 < \phi \text{field} \quad (2),$$

where $\phi s9$ is the effective aperture of the fourth lens on its image side, and $\phi \text{field}$ is the largest image height of the image forming optical system.

Conditional expression (2) limits the effective aperture of the fourth lens on its image side smaller than the image height of the optical system. If the effective aperture of the fourth lens becomes larger than the radius of the effective image circle (i.e. the largest image height), off-axis beams having a large angle of incidence on the fifth lens will be reflected and enter the fourth lens again to possibly cause ghost images.

Figure 16:
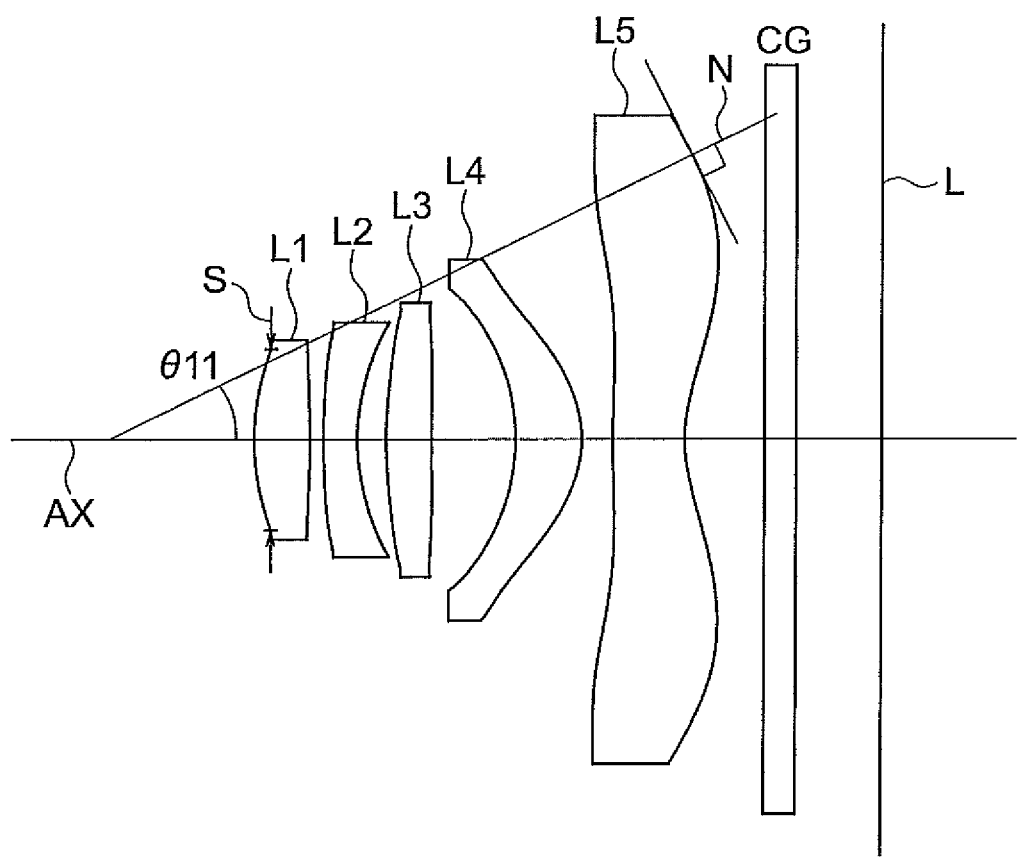
FIG. 16 is a cross sectional view taken along the optical axis, showing the optical configuration of the taking optical system according to a mode of the present invention, for illustrating angle θ11.

In the image forming optical system according to this mode, it is preferred that the following conditional expression (3) be satisfied:

$$\theta 11 < 40° \quad (3),$$

where θ11 is the largest value of the angle formed by the optical axis and the normal N of the image side surface of the fifth lens over the entire area within the effective aperture, as shown in FIG. 16.

FIG. 16, which illustrates θ11, is across sectional view taken along the optical system, showing the optical configuration of the image pickup optical system according to this mode of the present invention in the state in which the optical system is focused on an object point at infinity.

Conditional expression (3) relates to the image side surface of the fifth lens.

If the upper limit of conditional expression (3) is exceeded, the surface has large undulations. Then, coating spots tend to occur when applying anti-reflection coating on the lens surface by vapor deposition, leading to light reflection on the lens surface, which might cause ghost images. In addition, reflection angle on the image side surface of the fifth lens becomes large. This leads to a large incidence angle of reflected rays traveling toward the object side, resulting in total reflection, which will cause strong ghost images.

In the image forming optical system according to this mode, it is preferred that the following conditional expression (4) be satisfied:

$$0.26 < L123/TTL < 0.294 \quad (4),$$

where L123 is the sum total of the thicknesses of the lenses and the air distances from the object side surface of the first lens to the image side surface of the third lens, and TTL is the total optical length of the image forming optical system. In connection with the total optical length TTL mentioned here, in the after mentioned Examples, the thickness of the glass plate denoted by surface number 12 is not converted into an equivalent air distance.

Conditional expression (4) specifies a condition for correcting spherical aberration favorably and preventing decrease in the ease of manufacturing with a reduction in the optical length.

If the upper limit of conditional expression (4) is exceeded, the distance from the first lens to the third lens becomes large, and the diameter of the bundle of axial rays upon passing the third lens becomes small. Then, it is difficult to correct spherical aberration.

If the lower limit of conditional expression (4) is not reached, the lens thicknesses and air distances from the first lens to the third lens become small, making the sensitivity to manufacturing errors worse, disadvantageously.

It is more preferred that the following conditional expression (4') be satisfied instead of conditional expression (4):

$$0.27 < L123/TTL < 0.292 \quad (4').$$

It is still more preferred that the following conditional expression (4") be satisfied instead of conditional expression (4):

$$0.28 < L123/TTL < 0.29 \quad (4").$$

In the image forming optical system according to this mode, it is preferred that the following conditional expression (5) be satisfied:

$$-0.6 < r8/f < -0.35 \quad (5),$$

where r8 is the paraxial radius of curvature of the object side surface of the fourth lens, and f is the focal length of the entire image forming optical system.

Conditional expression (5) pertains to the object side surface of the fourth lens.

If the upper limit of conditional expression (5) is exceeded, the paraxial radius of curvature of the fourth lens becomes so large that the angle of incidence of rays on the fourth lens becomes large. Then, coma will be conspicuous, and it will be difficult to correct aberrations.

If the lower limit of conditional expression (5) is not reached, the paraxial radius of curvature becomes small, the refractive power of the fourth lens becomes large. Then, the sensitivity to manufacturing errors will become high, undesirably.

It is more preferred that the following conditional expression (5') be satisfied instead of conditional expression (5):

$$-0.57 < r8/f < -0.41 \quad (5').$$

It is still more preferred that the following conditional expression (5") be satisfied instead of conditional expression (5):

$$-0.45 < r8/f < -0.41 \quad (5").$$

In the image forming optical system according to this mode, it is preferred that the following conditional expression (6) be satisfied:

$$0.35 < f1/f3 < 0.48 \quad (6),$$

where f1 is the focal length of the first lens, and f3 is the focal length of the third lens.

Conditional expression (6) specifies appropriate relationship between the power of the first lens and the power of the third lens.

If the upper limit of conditional expression (6) is exceeded, the refractive power of the third lens becomes so large relative to the refractive power of the first lens that axial chromatic aberration and chromatic aberration of magnification generated in the third lens will become conspicuous, making it difficult to correct aberrations. In addition, the sensitivity to manufacturing errors of the third lens will become high, undesirably.

Conversely, if the lower limit of conditional expression (6) is not reached, the refractive power of the first lens becomes so large relative to the refractive power of the third lens that coma generated in the first lens will become conspicuous, making it difficult to correct aberrations. In addition, the sensitivity to manufacturing errors of the first lens will become high, undesirably.

It is more preferred that the following conditional expression (6') be satisfied instead of conditional expression (6):

$$0.37 < f1/f3 < 0.46 \quad (6').$$

It is still more preferred that the following conditional expression (6") be satisfied instead of conditional expression (6):

$$0.39 < f1/f3 < 0.43 \quad (6").$$

In the image forming optical system according to this mode, it is preferred that the stop be located closer to the image side than the surface vertex of the first lens.

By disposing the stop on the image side of the surface vertex of the first lens, the angle of incidence of upper rays of the off-axis beams on the object side surface of the first lens can be made small. In consequence, coma can be made small.

In the image forming optical system according to this mode, it is preferred that the first lens, the second lens, the third lens, the fourth lens, and the fifth lens be made of a resin.

By using a resin for the first lens, the second lens, the third lens, the fourth lens, and the fifth lens, an image pickup lens can be provided at low price.

It is preferred that an image pickup apparatus according to this mode include the image forming optical system described above and an auto-focusing mechanism that are integrated together.

It is preferred that an image pickup apparatus according to this mode include the image forming optical system described above and an image pickup element that are integrated together.

In the embodiments described in the following, a stop is located closer to the object side than the image side surface of the first lens, more specifically between the object side surface and the image side surface of the first lens. The expression "a stop disposed closest to the object side" shall be construed to include a stop arranged in this way.

EMBODIMENTS

In the following, embodiments of the image forming optical system and the image pickup apparatus according to the present invention will be described in detail with reference to the drawings. It should be understood, however, that the present invention is by no means limited by the embodiments.

Now, a zoom lens according to a first embodiment will be described. FIG. 1 is a cross sectional view taken along the optical axis, showing the optical configuration of the zoom lens according to the first embodiment of the present invention in the state in which the zoom lens is focused on an object point at infinity.

FIGS. 2A, 2B, 2C, and 2D respectively show spherical aberration (SA), astigmatism (AS), distortion (DT), and chromatic aberration of magnification (CC) of the zoom lens according to the first embodiment in the state in which the zoom lens is focused on an object point at infinity. In these aberration diagrams, FIY represents the image height. The same symbols in the aberration diagrams are used also in all the embodiments described in the following.

As shown in FIG. 1, the zoom lens according to the first embodiment includes, in order from the object side, an aperture stop S, a biconvex positive lens L1 (first lens), a negative meniscus lens L2 (second lens) having a convex surface directed toward the object side, a positive meniscus lens L3 (third lens) having a convex surface directed toward the object side, a positive meniscus lens L4 (fourth lens) having a convex surface directed toward the image side, and a negative meniscus lens L5 (fifth lens) having a convex surface directed toward the object side. The zoom lens according to the first embodiment has a positive refractive power as a whole.

In the cross sectional view of the zoom lens according to all the embodiments described in the following, CG denotes a cover glass, and I denotes the image pickup surface of an electronic image pickup element.

There are ten aspheric surfaces, which include both surfaces of the biconvex positive lens L1, both surfaces of the negative meniscus lens L2, both surfaces of the positive meniscus lens L3, both surfaces of the positive meniscus lens L4, and both surfaces of the negative meniscus lens L5.

Figure 3:
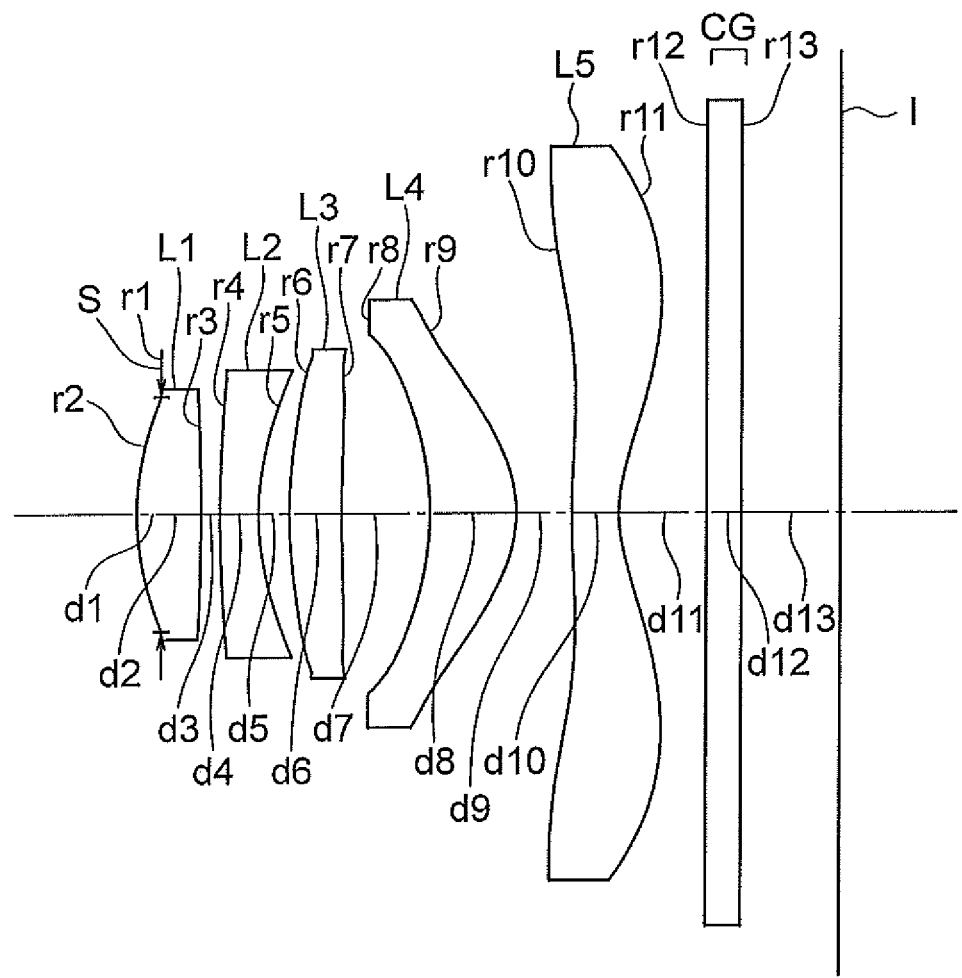
FIG. 3 is a cross sectional view taken along the optical axis, showing the optical configuration of a taking optical system according to a second embodiment of the present invention.
Figure 4:
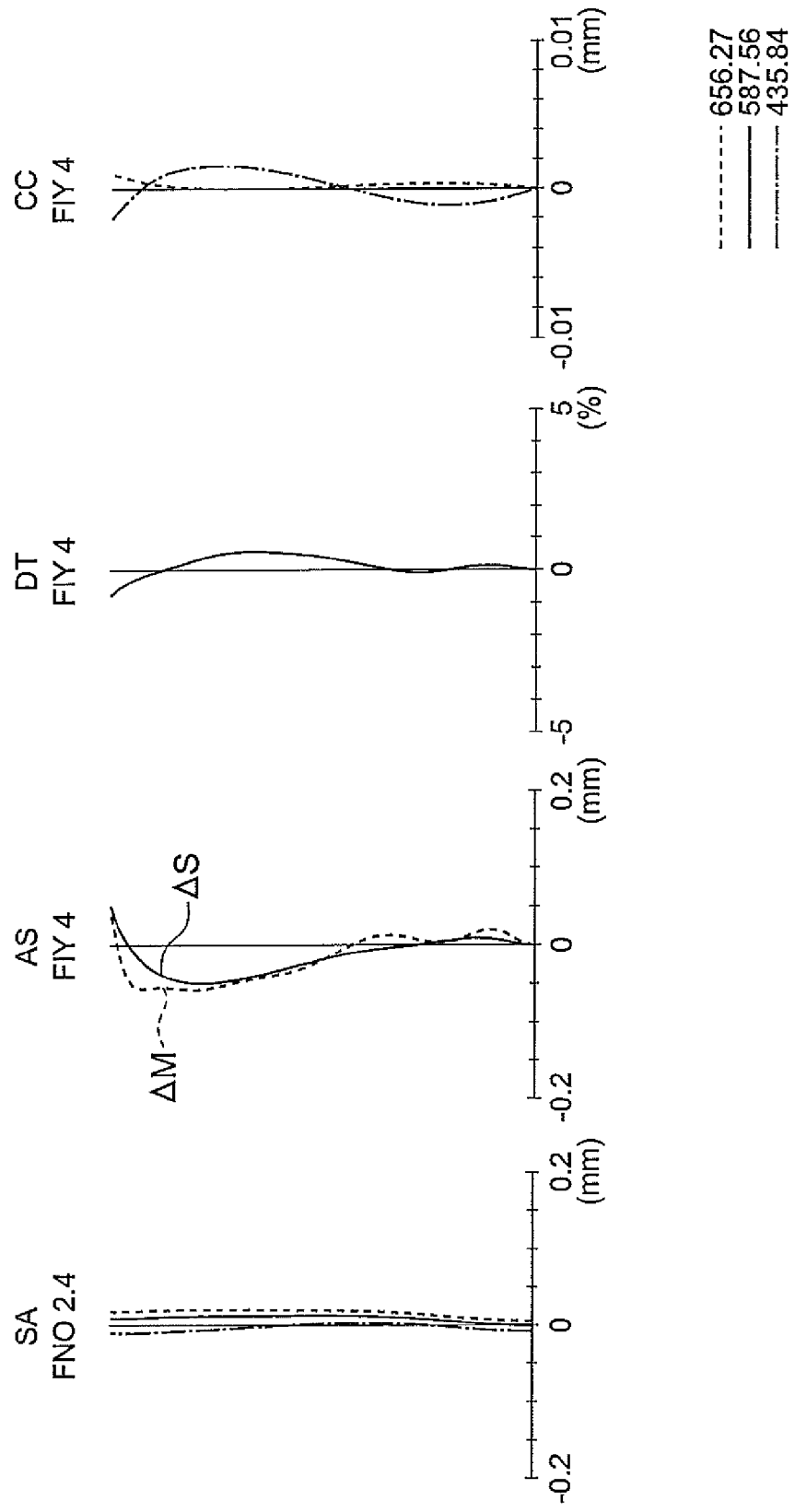
FIGS. 4A, 4B, 4C, and 4D respectively show spherical aberration (SA), astigmatism (AS), distortion (DT), and chromatic aberration of magnification (CC) of the taking optical system according to the second embodiment in the state in which the taking optical system is focused on an object point at infinity.

Next, a zoom lens according to a second embodiment will be described. FIG. 3 is a cross sectional view taken along the optical axis showing the optical configuration of the zoom lens according to the second embodiment of the present invention in the state in which the zoom lens is focused on an object point at infinity.

FIGS. 4A, 4B, 4C, and 4D respectively show spherical aberration, astigmatism, distortion, and chromatic aberration of magnification of the zoom lens according to the second embodiment in the state in which the zoom lens is focused on an object point at infinity.

As shown in FIG. 3, the zoom lens according to the second embodiment includes an aperture stop S, a biconvex positive lens L1, a negative meniscus lens L2 having a convex surface directed toward the object side, a positive meniscus lens L3 having a convex surface directed toward the object side, a positive meniscus lens L4 having a convex surface directed toward the image side, and a negative meniscus lens L5 having a convex surface directed toward the object side. The zoom lens according to the second embodiment has a positive refractive power as a whole.

There are ten aspheric surfaces, which include both surfaces of the biconvex positive lens L1, both surfaces of the negative meniscus lens L2, both surfaces of the positive meniscus lens L3, both surfaces of the positive meniscus lens L4, and both surfaces of the negative meniscus lens L5.

Figure 5:
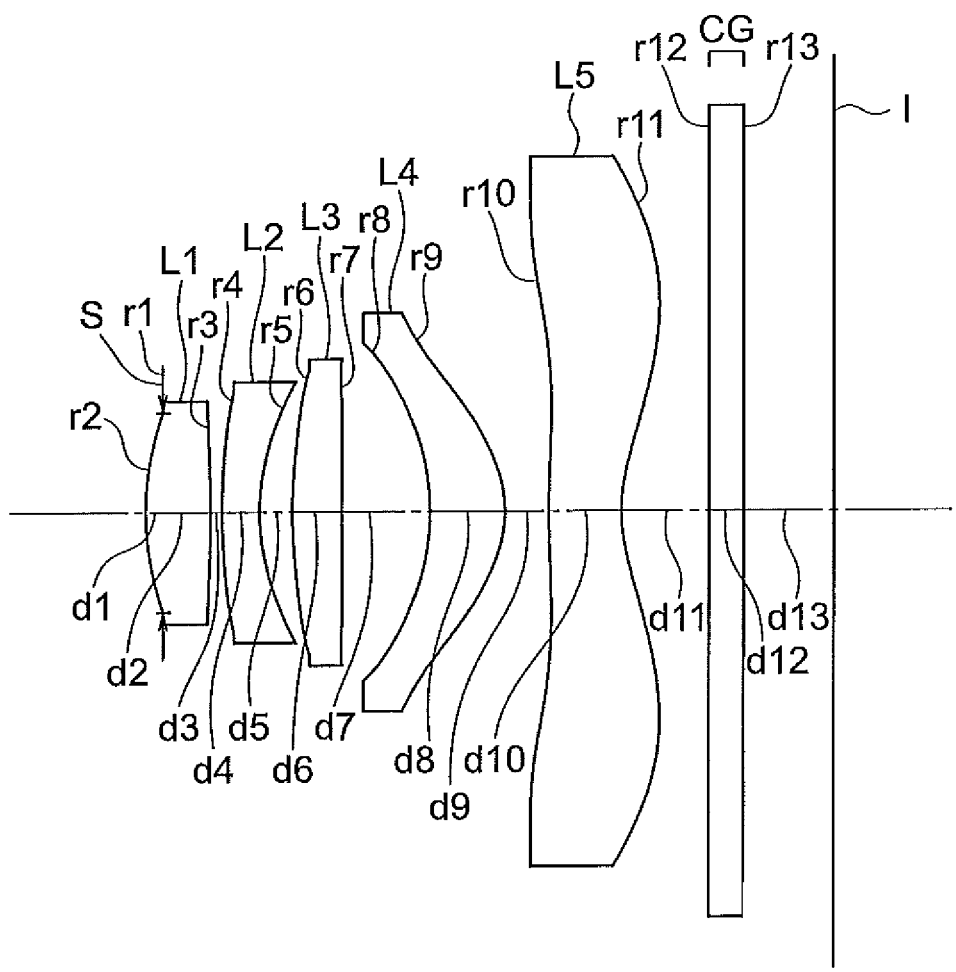
FIG. 5 is a cross sectional view taken along the optical axis, showing the optical configuration of a taking optical system according to a third embodiment of the present invention.
Figure 6:
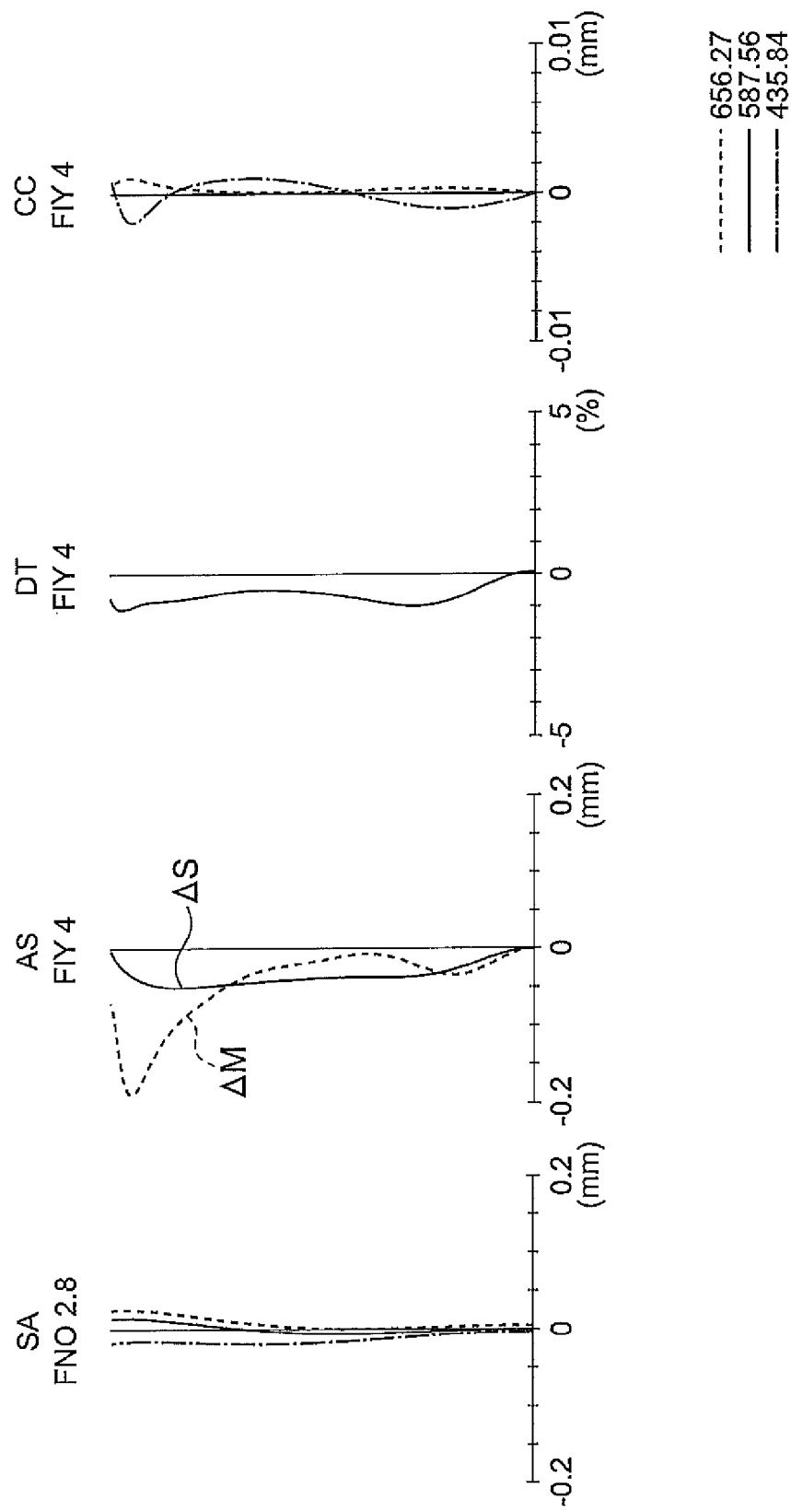
FIGS. 6A, 6B, 6C, and 6D respectively show spherical aberration (SA), astigmatism (AS), distortion (DT), and chromatic aberration of magnification (CC) of the taking optical system according to the third embodiment in the state in which the taking optical system is focused on an object point at infinity.

Next, a zoom lens according to a third embodiment will be described. FIG. 5 is a cross sectional view taken along the optical axis, showing the optical configuration of the zoom lens according to the third embodiment of the present invention in the state in which the zoom lens is focused on an object point at infinity.

FIGS. 6A, 6B, 6C, and 6D respectively show spherical aberration, astigmatism, distortion, and chromatic aberration of magnification of the zoom lens according to the third embodiment in the state in which the zoom lens is focused on an object point at infinity.

As shown in FIG. 5, the zoom lens according to the third embodiment includes an aperture stop S, a biconvex positive lens L1, a negative meniscus lens L2 having a convex surface directed toward the object side, a positive meniscus lens L3 having a convex surface directed toward the object side, a positive meniscus lens L4 having a convex surface directed toward the image side, and a negative meniscus lens L5 having a convex surface directed toward the object side. The zoom lens according to the third embodiment has a positive refractive power as a whole.

There are ten aspheric surfaces, which include both surfaces of the biconvex positive lens L1, both surfaces of the negative meniscus lens L2, both surfaces of the positive meniscus lens L3, both surfaces of the positive meniscus lens L4, and both surfaces of the negative meniscus lens L5.

Figure 7:
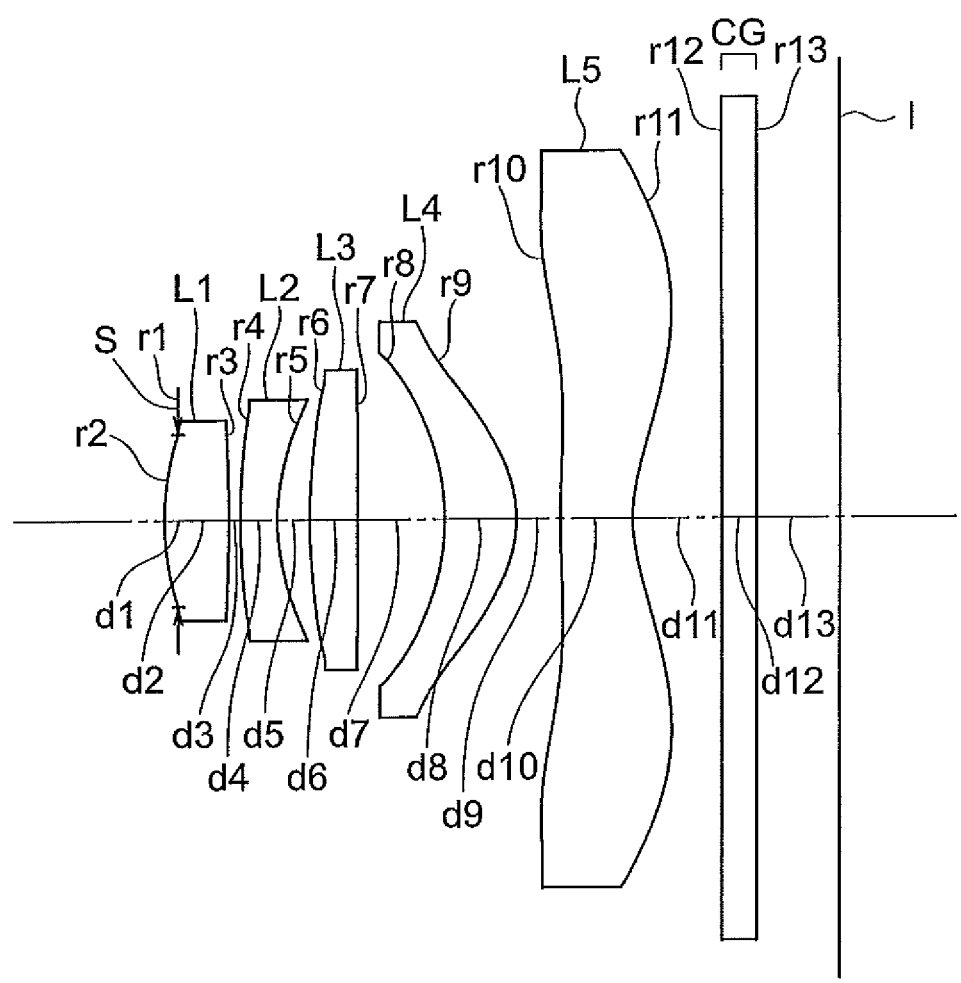
FIG. 7 is a cross sectional view taken along the optical axis, showing the optical configuration of a taking optical system according to a fourth embodiment of the present invention.
Figure 8:
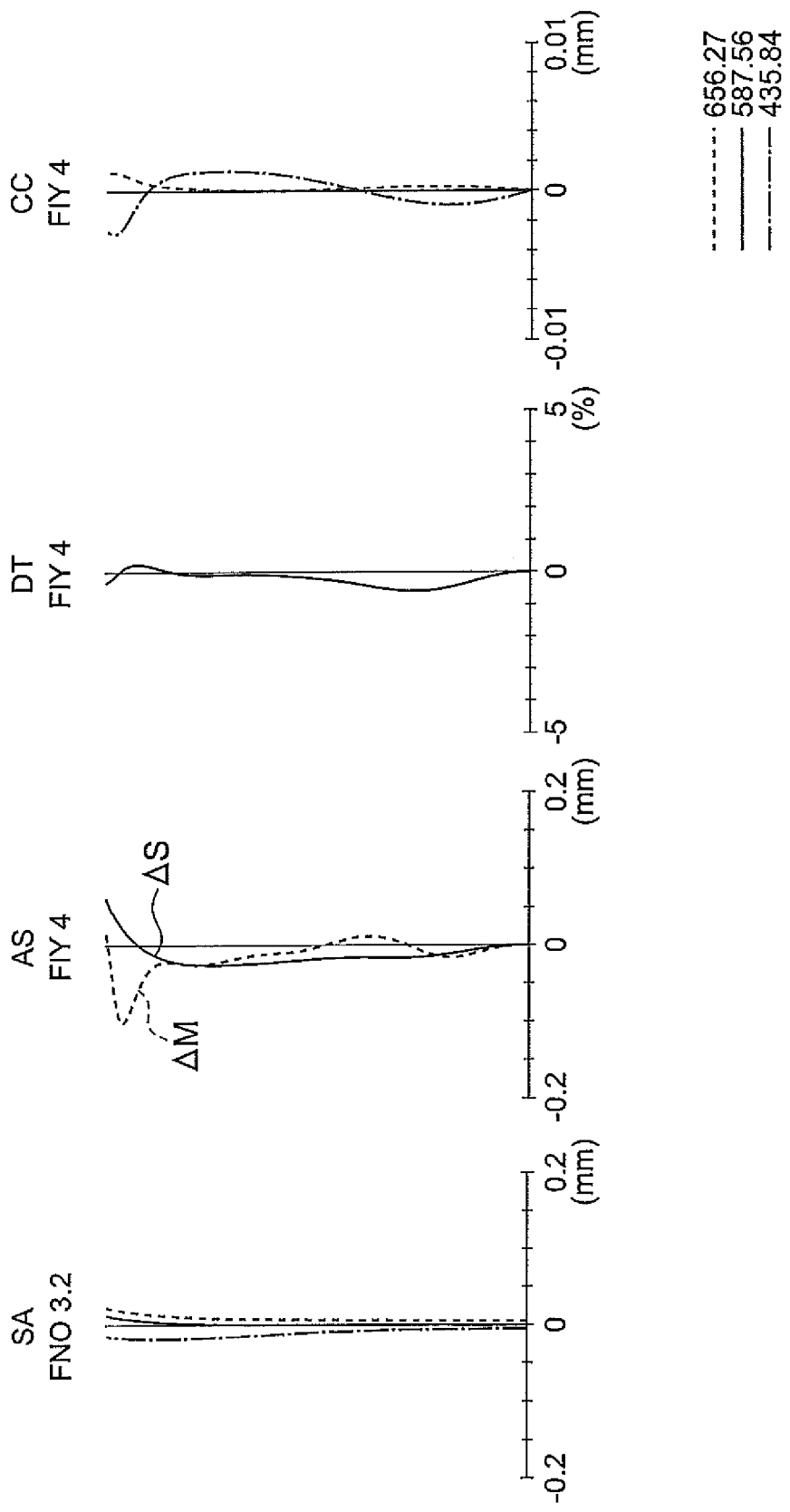
FIGS. 8A, 8B, 8C, and 8D respectively show spherical aberration (SA), astigmatism (AS), distortion (DT), and chromatic aberration of magnification (CC) of the taking optical system according to the fourth embodiment in the state in which the taking optical system is focused on an object point at infinity.

Next, a zoom lens according to a fourth embodiment will be described. FIG. 7 is a cross sectional view taken along the optical axis, showing the optical configuration of the zoom lens according to the fourth embodiment of the present invention in the state in which the zoom lens is focused on an object point at infinity.

FIGS. 8A, 8B, 8C, and 8D respectively show spherical aberration, astigmatism, distortion, and chromatic aberration of magnification of the zoom lens according to the fourth embodiment in the state in which the zoom lens is focused on an object point at infinity.

As shown in FIG. 7, the zoom lens according to the fourth embodiment includes, in order from the object side, an aperture stop S, a biconvex positive lens L1, a negative meniscus lens L2 having a convex surface directed toward the object side, a positive meniscus lens L3 having a convex surface directed toward the object side, a positive meniscus lens L4 having a convex surface directed toward the image side, and a negative meniscus lens L5 having a convex surface directed toward the object side. The zoom lens according to the fourth embodiment has a positive refractive power as a whole.

There are ten aspheric surfaces, which include both surfaces of the biconvex positive lens L1, both surfaces of the negative meniscus lens L2, both surfaces of the positive meniscus lens L3, both surfaces of the positive meniscus lens L4, and both surfaces of the negative meniscus lens L5.

In the following, numerical data of optical elements which constitute image forming optical systems of each embodiment described above is shown below. Each of r1, r2, . . . denotes paraxial radius of curvature of each lens surface, each of d1, d2, . . . denotes lens thickness or an air distance between two lenses, each of nd1, nd2, . . . denotes a refractive index of each lens for a d-line, each of vd1, vd2, . . . denotes an Abbe's number for each lens, and "focal length" denotes a focal length of the entire image forming optical system. Further, * denotes an aspheric data. "fb" (back focus) is a distance which is expressed upon air conversion.

When z is let to be in an optical axis direction, y is let to be in a direction orthogonal to the optical axis, K denotes a conical coefficient, $A_4$, $A_6$, $A_8$, and $A_{10}$ denote aspherical surface coefficients, a shape of the aspheric surface is described by the following expression (I).

$$z=(y^2/r)/[1+\{1-(K+1)(y/r)^2\}^{1/2}]+A_4y^4+A_6y^6+A_8y^8+A_{10}y^{10}+A_{12}y^{12} \quad (I)$$

where e indicates '$10^{-n}$'. These reference signs are common in numeral data of after-mentioned each embodiment.

Example 1

| Unit mm | | | | |
|---|---|---|---|---|
| Surface data | | | | |
| Surface no. | r | d | nd | vd |
| Object plane | ∞ | ∞ | | |
| 1(stop) | ∞ | −0.15 | | |
| 2* | 2.401 | 0.52 | 1.53463 | 56.22 |
| 3* | −10.740 | 0.13 | | |
| 4* | 7.578 | 0.32 | 1.61417 | 25.64 |
| 5* | 1.958 | 0.27 | | |
| 6* | 4.224 | 0.44 | 1.53463 | 56.22 |
| 7* | 34.692 | 0.80 | | |
| 8* | −2.000 | 0.63 | 1.53463 | 56.22 |
| 9* | −1.086 | 0.29 | | |
| 10* | 7.512 | 0.68 | 1.53463 | 56.22 |
| 11* | 1.396 | 0.75 | | |
| 12 | ∞ | 0.30 | 1.51633 | 64.14 |
| 13 | ∞ | 0.81 | | |
| Image plane (Image pickup surface) | ∞ | | | |
| Aspherical surface data | | | | |
| 2nd surface | | | | |

K = −1.324

-continued

Unit mm

A4 = 1.66076e−03, A6 = −3.90365e−03, A8 = −9.33614e−04,
A10 = −1.34428e−04
3rd surface K = −65.440
A4 = 6.88876e−03, A6 = 3.15920e−02, A8 = −4.49798e−02,
A10 = 2.03710e−02
4th surface K = −47.348
A4 = −3.33173e−02, A6 = 1.40676e−01, A8 = −1.35475e−01,
A10 = 4.83422e−02
5th surface K = −8.070
A4 = 1.08057e−02, A6 = 8.76319e−02, A8 = −8.03573e−02,
A10 = 2.35495e−02
6th surface K = −44.127
A4 = 9.06254e−03, A6 = −3.08109e−02, A8 = 3.92899e−02,
A10 = −1.18424e−02
7th surface K = 0.784
A4 = −2.29010e−02, A6 = 6.12065e−02, A8 = −1.35306e−02,
A10 = 7.78729e−03
8th surface K = −0.303
A4 = −4.19019e−03, A6 = −6.58463e−04, A8 = 7.05634e−03,
A10 = −3.77606e−03, A12 = −1.55491e−05
9th surface K = −1.559
A4 = 1.69598e−02, A6 = −2.21033e−02, A8 = 8.26692e−03,
A10 = 1.83657e−03, A12 = −7.35257e−04
10th surface K = −438.512
A4 = −2.17832e−02, A6 = 1.20323e−03, A8 = 5.91454e−04,
A10 = −8.67482e−05, A12 = 3.54084e−06, A14 = −1.20847e−08
11th surface K = −7.775
A4 = −3.07518e−02, A6 = 5.44554e−03, A8 = −8.17781e−04,
A10 = 6.80091e−05, A12 = −2.19957e−06, A14 = 1.27436e−09

Various data

| | |
|---|---|
| fb (in air) | 1.76 |
| Lens total length (in air) | 5.85 |
| Focal length | 4.86 |
| φs10/2 | 2.77 |

"Lens total length (in air)" is an optical total length when a glass plate having a surface number 12 is expressed upon air conversion, in each of Examples 1 to 4.

Example 2

Unit mm

Surface data

| Surface no. | r | d | nd | vd |
|---|---|---|---|---|
| Object plane | ∞ | ∞ | | |
| 1(stop) | ∞ | −0.21 | | |
| 2* | 2.459 | 0.55 | 1.53463 | 56.22 |
| 3* | −21.614 | 0.16 | | |
| 4* | 7.699 | 0.33 | 1.61417 | 25.64 |
| 5* | 2.078 | 0.27 | | |
| 6* | 3.677 | 0.45 | 1.53463 | 56.22 |
| 7* | 14.105 | 0.76 | | |
| 8* | −2.745 | 0.74 | 1.53463 | 56.22 |
| 9* | −1.171 | 0.48 | | |
| 10* | 4.656 | 0.40 | 1.53463 | 56.22 |
| 11* | 1.204 | 0.75 | | |
| 12 | ∞ | 0.30 | 1.51633 | 64.14 |
| 13 | ∞ | 0.84 | | |
| Image plane (Image pickup surface) | ∞ | | | |

Aspherical surface data

2nd surface

K = −1.044
A4 = 2.49310e−03, A6 = 1.72515e−03, A8 = −3.13537e−03
3rd surface

K = −3.793
A4 = −1.49471e−02, A6 = 5.54994e−02, A8 = −5.83938e−02,
A10 = 1.92555e−02
4th surface K = −152.889
A4 = −5.55246e−02, A6 = 1.35201e−01, A8 = −1.23385e−01,
A10 = 3.95670e−02
5th surface K = −10.082
A4 = −5.81291e−03, A6 = 7.85361e−02, A8 = −6.52767e−02,
A10 = 1.71395e−02
6th surface K = −33.196
A4 = 2.02435e−02, A6 = −3.57377e−02, A8 = 2.70758e−02,
A10 = −5.41416e−03
7th surface K = −417.653
A4 = 1.01548e−03, A6 = −7.17533e−03, A8 = −8.13242e−03,
A10 = 5.39293e−03
8th surface K = 0.009
A4 = −4.05578e−03, A6 = 1.33966e−02, A8 = −4.80230e−03,
A10 = −1.86127e−04, A12 = −9.88582e−05
9th surface K = −2.381
A4 = −1.27976e−02, A6 = −6.20545e−03, A8 = 7.77262e−03,
A10 = −1.28568e−03, A12 = −1.02634e−05
10th surface K = −169.578
A4 = −2.39409e−02, A6 = 2.87488e−03, A8 = 5.87744e−05,
A10 = −2.50853e−05, A12 = 1.03377e−06
11th surface K = −6.968
A4 = −2.91346e−02, A6 = 5.01845e−03, A8 = −6.85431e−04,
A10 = 5.11495e−05, A12 = −1.52851e−06

Various data

| | |
|---|---|
| fb (in air) | 1.79 |
| Lens total length (in air) | 5.93 |
| Focal length | 4.90 |
| φs10/2 | 2.93 |

Example 3

Unit mm

Surface data

| Surface no. | r | d | nd | νd |
|---|---|---|---|---|
| Object plane | ∞ | ∞ | | |
| 1(stop) | ∞ | −0.15 | | |
| 2* | 2.403 | 0.56 | 1.53463 | 56.22 |
| 3* | −10.632 | 0.10 | | |
| 4* | 5.689 | 0.32 | 1.61417 | 25.64 |
| 5* | 1.814 | 0.28 | | |
| 6* | 4.244 | 0.42 | 1.53463 | 56.22 |
| 7* | 25.530 | 0.76 | | |
| 8* | −2.060 | 0.64 | 1.53463 | 56.22 |
| 9* | −1.097 | 0.38 | | |
| 10* | 6.896 | 0.62 | 1.53463 | 56.22 |
| 11* | 1.341 | 0.75 | | |
| 12 | ∞ | 0.30 | 1.51633 | 64.14 |
| 13 | ∞ | 0.76 | | |
| Image plane (Image pickup surface) | ∞ | | | |

Aspherical surface data

2nd surface

K = −1.252
A4 = 2.66457e−03, A6 = −4.99724e−03, A8 = −2.45538e−04

3rd surface

K = −112.661
A4 = 8.15795e−03, A6 = 3.20136e−02, A8 = −4.49979e−02,
A10 = 1.74104e−02

4th surface

K = −43.887
A4 = −3.28764e−02, A6 = 1.41037e−01, A8 = −1.36820e−01,
A10 = 4.69478e−02

5th surface

K = −8.128
A4 = 1.24395e−02, A6 = 8.94232e−02, A8 = −8.08320e−02,
A10 = 2.24923e−02

6th surface

K = −50.424
A4 = 1.05876e−02, A6 = −3.01259e−02, A8 = 3.95072e−02,
A10 = −1.14127e−02

7th surface

K = −0.086
A4 = −1.99035e−02, A6 = 5.80907e−03, A8 = −1.34852e−02,
A10 = 7.62205e−03

8th surface

K = −0.457
A4 = −1.21968e−02, A6 = 1.21799e−03, A8 = 6.44844e−03,
A10 = −3.49203e−03, A12 = −8.44482e−06

9th surface

K = −1.656
A4 = 1.40720e−02, A6 = −2.25884e−02, A8 = 9.90944e−03,
A10 = 1.67768e−03, A12 = −7.92046e−04

10th surface

K = −209.266
A4 = −2.35495e−02, A6 = 1.46369e−03, A8 = 5.87424e−04,
A10 = −8.70704e−05, A12 = 3.37018e−06

11th surface

K = −7.421
A4 = −3.03361e−02, A6 = 5.23536e−03, A8 = −7.66791e−04,
A10 = 6.31945e−05, A12 = −2.03435e−06

Various data

Unit mm

| | |
|---|---|
| fb (in air) | 1.71 |
| Lens total length (in air) | 5.77 |
| Focal length | 4.84 |
| φs10/2 | 2.72 |

Example 4

Unit mm

Surface data

| Surface no. | r | d | nd | νd |
|---|---|---|---|---|
| Object plane | ∞ | ∞ | | |
| 1(stop) | ∞ | −0.12 | | |
| 2* | 2.370 | 0.54 | 1.53463 | 56.22 |
| 3* | −10.791 | 0.10 | | |
| 4* | 5.783 | 0.32 | 1.61417 | 25.64 |
| 5* | 1.834 | 0.27 | | |
| 6* | 4.208 | 0.41 | 1.53463 | 56.22 |
| 7* | 26.084 | 0.75 | | |
| 8* | −2.058 | 0.61 | 1.53463 | 56.22 |
| 9* | −1.099 | 0.37 | | |
| 10* | 6.917 | 0.62 | 1.53463 | 56.22 |
| 11* | 1.340 | 0.75 | | |
| 12 | ∞ | 0.30 | 1.51633 | 64.14 |
| 13 | ∞ | 0.71 | | |
| Image plane (Image pickup surface) | ∞ | | | |

Aspherical surface data

2nd surface

K = −1.133
A4 = 3.74182e−03, A6 = −5.38332e−03, A8 = −1.74089e−03

3rd surface

K = −104.892
A4 = 7.62554e−03, A6 = 3.09561e−02, A8 = −4.55914e−02,
A10 = 1.86478e−02

4th surface

K = −44.640
A4 = −3.29840e−02, A6 = 1.41861e−01, A8 = −1.36131e−01,
A10 = 4.51274e−02

5th surface

K = −8.078
A4 = 1.27253e−02, A6 = 8.92795e−02, A8 = −8.14523e−02,
A10 = 2.29761e−02

6th surface

K = −50.577
A4 = 1.03050e−02, A6 = −3.04839e−02, A8 = 3.93565e−02,
A10 = −1.14100e−02

7th surface

K = 23.445
A4 = −1.96826e−02, A6 = 6.03505e−03, A8 = −1.33385e−02,
A10 = 7.68778e−03

8th surface

K = −0.440
A4 = −9.05605e−04, A6 = 9.89771e−04, A8 = 6.36070e−03,
A10 = −3.53082e−03, A12 = −2.89391e−05

9th surface

K = −1.675
A4 = 1.44462e−02, A6 = −2.25241e−02, A8 = 9.92328e−03,
A10 = 1.68107e−03, A12 = −7.91075e−04

10th surface

-continued

Unit mm

K = −263.448
A4 = −2.35713e−02, A6 = 1.46792e−03, A8 = 5.87665e−04,
A10 = −8.69496e−05, A12 = 3.41047e−06
11th surface K = −7.420
A4 = −3.00602e−02, A6 = 5.24587e−03, A8 = −7.66710e−04,
A10 = 6.31754e−05, A12 = −2.03611e−06

Various data

| fb (in air) | 1.65 |
|---|---|
| Lens total length (in air) | 5.65 |
| Focal length | 4.74 |
| φs10/2 | 2.86 |

Next, parameter and values of conditional expressions in each of embodiments described above are described.

| No. | Conditional expressions | Example1 | Example2 | Example 3 | Example4 |
|---|---|---|---|---|---|
| (1) | φs9/φs10 | 0.628 | 0.635 | 0.632 | 0.598 |
| (2) | φs9/2 | 1.74 | 1.86 | 1.72 | 1.71 |
| (2) | φfield | 4.005 | 4 | 4 | 4 |
| (3) | θ11 | 32 | 37 | 30 | 32 |
| (4) | L123/TTL | 0.282 | 0.293 | 0.286 | 0.286 |
| (5) | r8/f | −0.411 | −0.561 | −0.426 | −0.434 |
| (6) | f1/f3 | 0.416 | 0.454 | 0.394 | 0.396 |

Thus, it is possible to use such image forming optical system (image pickup optical system) of the present invention in an image pickup apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Modes thereof will be exemplified below.

(Information Processing Apparatus)

The above-described zoom lens or the image pickup apparatus using the zoom lens according to the present invention can be incorporated in an information processing apparatus such as portable electronic equipment. Examples of the information processing apparatus include, but not limited to, a digital camera as portable electronic equipment, a personal computer, and a cellular phone. The information processing apparatus according to the present invention is not limited to portable electronic equipment.

Figure 17:
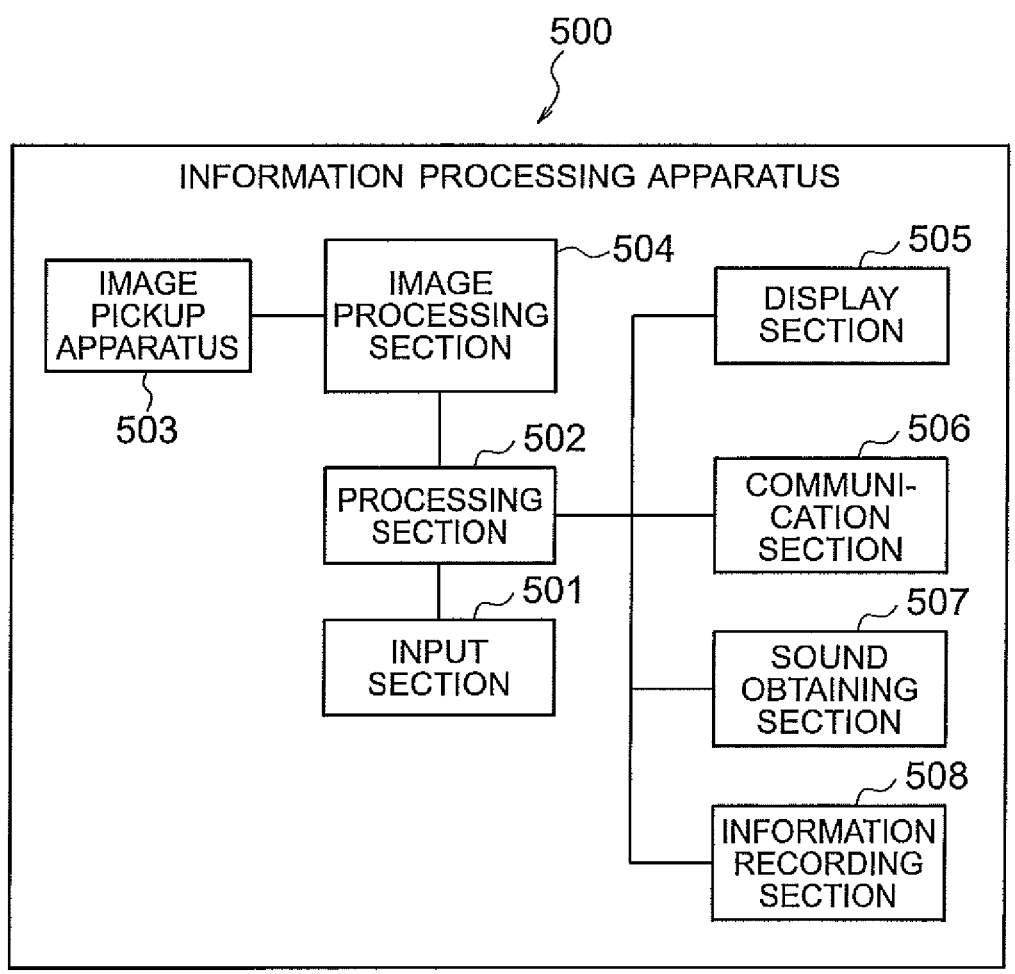
FIG. 17 is a block diagram showing the configuration of a processing section of an information processing apparatus.

FIG. 17 is a block diagram of such an information processing apparatus. The information processing apparatus 500 has an input section (portion) 501, a processing section 502, an image pickup apparatus 503, an image processing section 504, and a display section 505. It is preferred that the information processing apparatus further have a communication section 506, a sound obtaining section 507, and an information recording section 508, as shown in FIG. 17.

The input section 501 is used to operate the information processing apparatus 500. The processing section 502 processes, at least, information from the input section 501. The image pickup apparatus 503 obtains image information based on information from the processing section 502. The image processing section 504 processes the image information obtained by the image pickup apparatus 503. The display section displays the processed image. The image pickup apparatus 503 is using a zoom lens according to the present invention.

The communication section 506 is configured to be capable of transmitting (communicating) the image information obtained by the image pickup apparatus 503. The sound obtaining section 507 is configured to obtain sound (or voice) information, and the information recording section 509 records the obtained image information and/or sound information.

Figure 9:
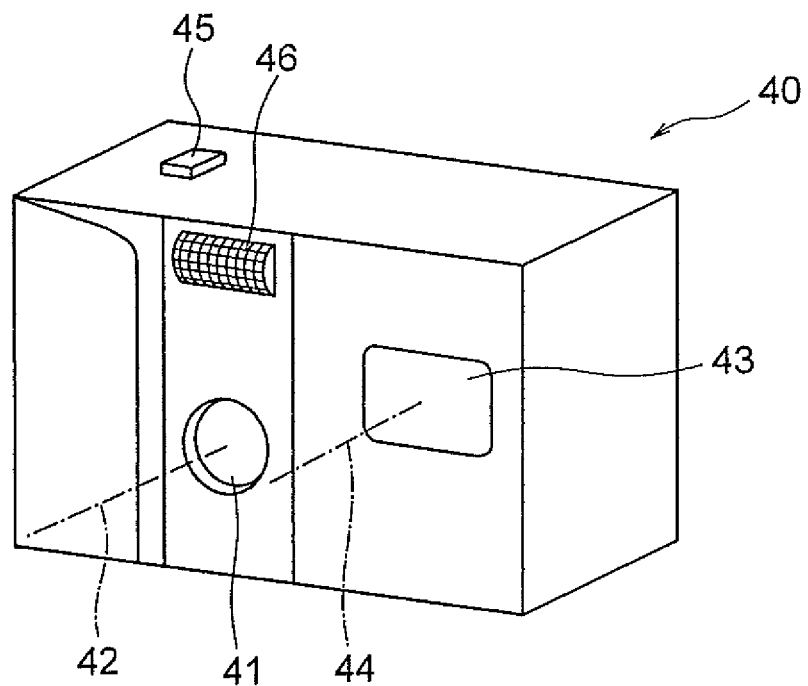
FIG. 9 is a front perspective view showing the outer appearance of a digital camera 40 equipped with a taking optical system according to the present invention.
Figure 10:
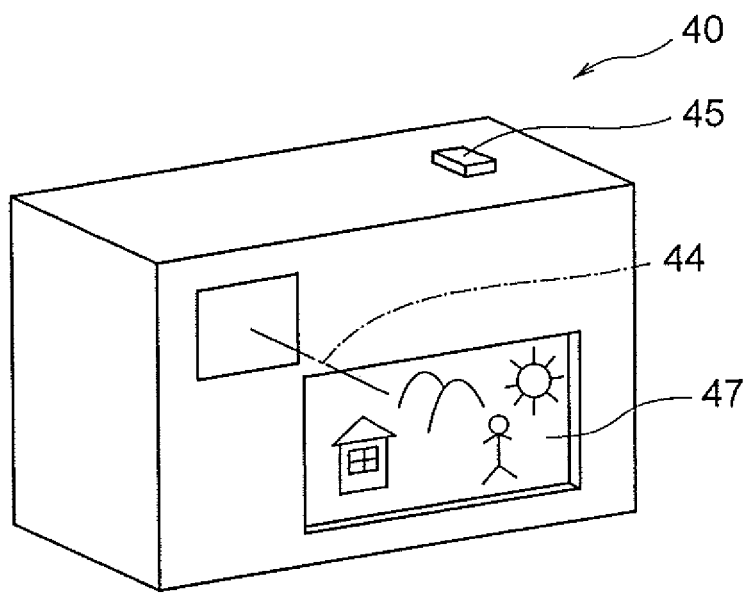
FIG. 10 is a rear perspective view of the digital camera 40.
Figure 11:
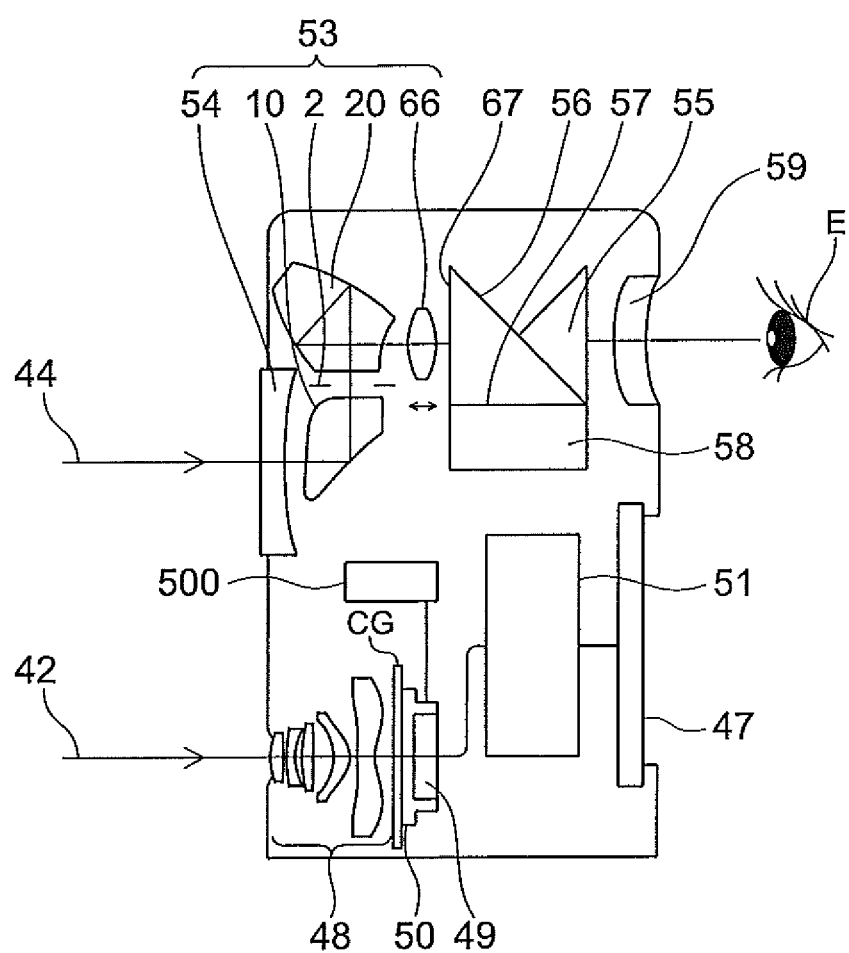
FIG. 11 is a cross sectional view showing the optical configuration of the digital camera 40.

In FIG. 9 to FIG. 11 show conceptual diagrams of structures in which the image forming optical system according to the present invention is incorporated in a photographic optical system 41 of a digital camera. FIG. 9 is a frontward perspective view showing an appearance of a digital camera 40, FIG. 10 is a rearward perspective view of the same, and FIG. 11 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter button 45, a flash 46, and a liquid-crystal display monitor 47. Moreover, when the shutter button 45 disposed at an upper portion of the camera 40 is pressed, in conjugation with this, a photograph is taken through the photographic optical system 41 such as the objective optical system for photography 48 in the first embodiment.

An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image to an eyeball E of the observer is disposed.

By the digital camera 40 structured in such manner, it is possible to realize an electrical image pickup apparatus having a zoom lens with a reduced size and thickness, in which the number of structural components of the photographic optical system 41 is reduced. Further, the present invention could be applied not only to the above-mentioned collapsible type digital camera but also to a bending type digital camera having a bending optical system.

The digital camera includes an auto-focus mechanism 500 which is integrated with an image pickup optical system. By installing the auto-focus mechanism 500, it is possible to focus at any object distance.

Moreover, it is desirable that the image pickup optical system and an electronic image pickup element chip (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a digital camera (an image pickup apparatus) having a small size and an improved performance.

Figure 12:
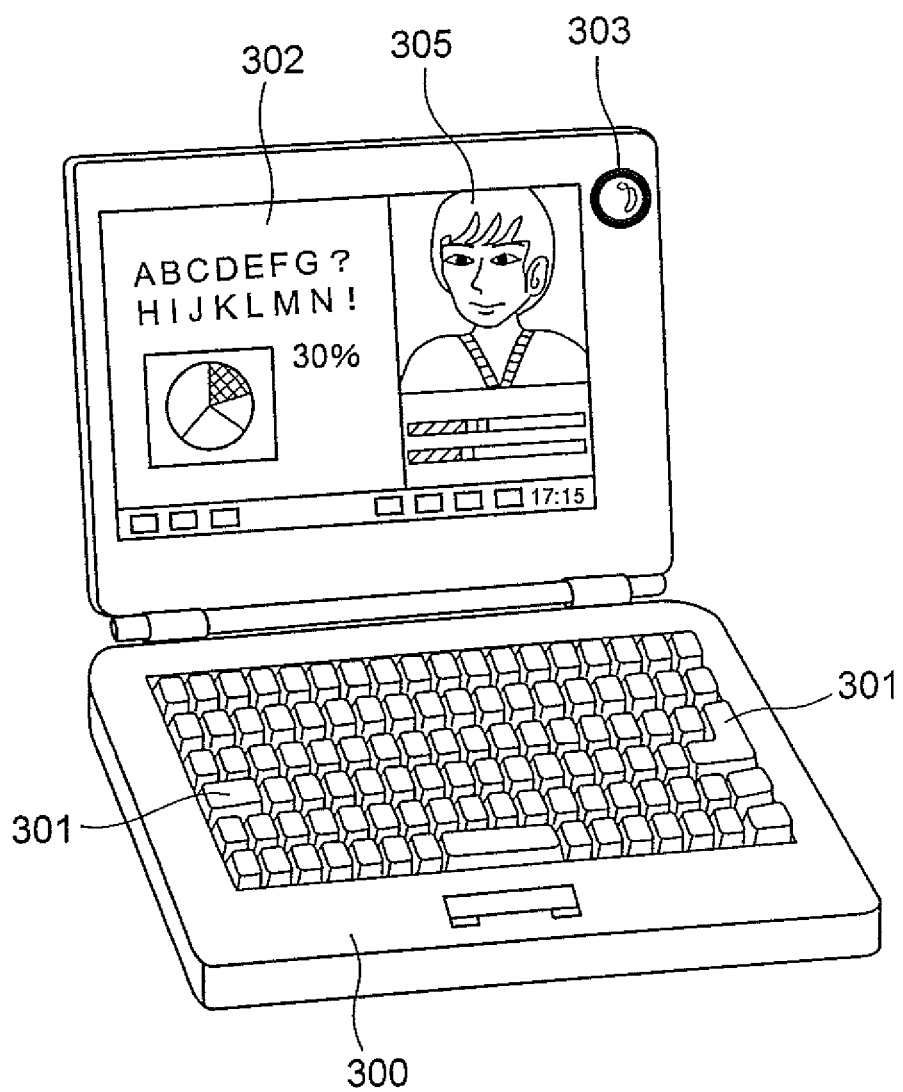
FIG. 12 is a front perspective view showing a personal computer 300 as an example of an information processing apparatus in which a taking optical system according to the present invention is provided as an objective optical system, in a state in which the cover is open.
Figure 13:
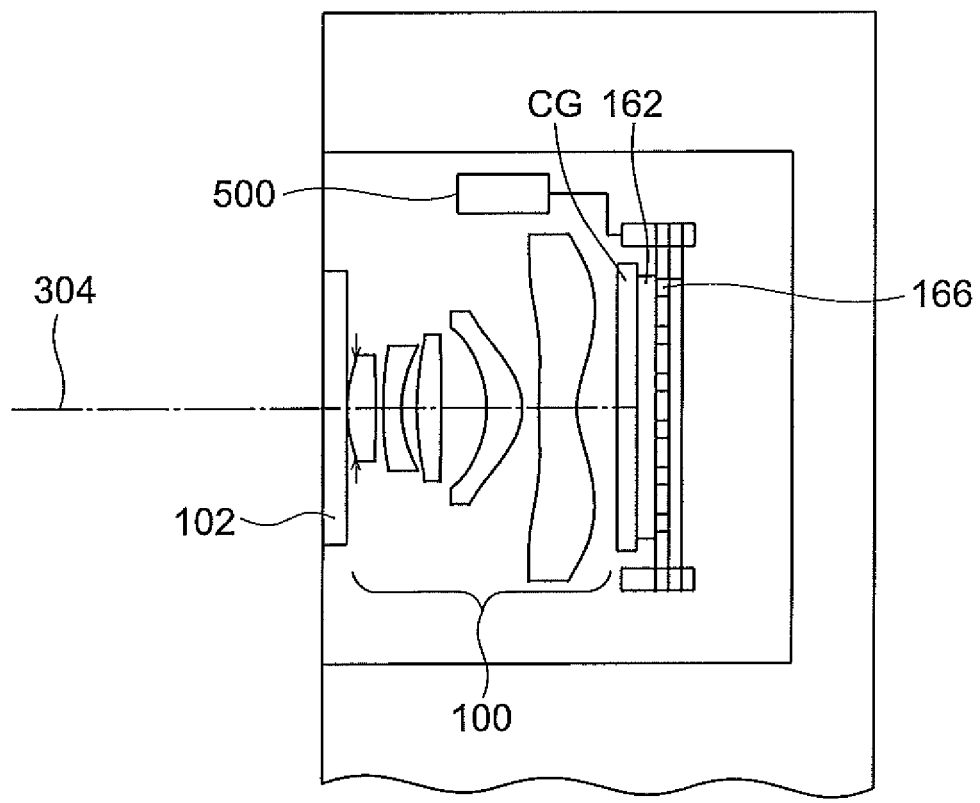
FIG. 13 is a cross sectional view of the taking optical system 303 of the personal computer 300.
Figure 14:
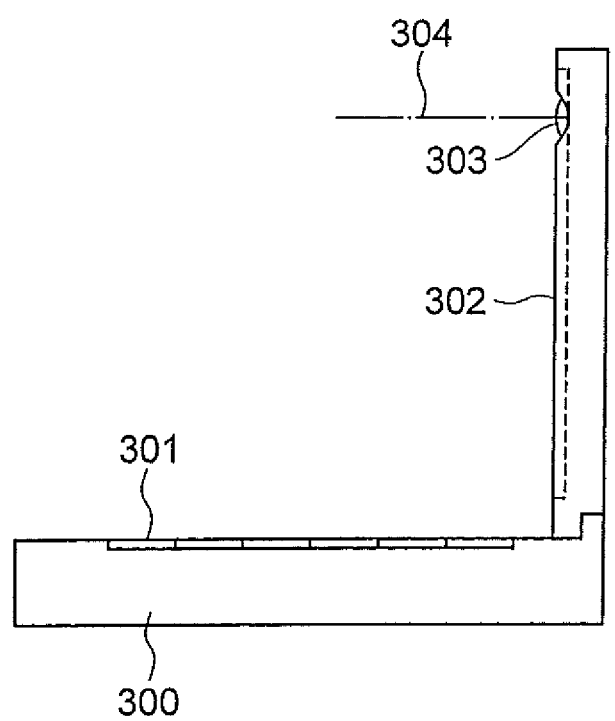
FIG. 14 is a side view of the personal computer 300.

Next, a personal computer which is an example of an information processing apparatus with a built-in image forming system as an objective optical system is shown in FIG. 12 to FIG. 14. FIG. 12 is a frontward perspective view of a personal computer 300 with its cover opened, FIG. 13 is a cross-sectional view of a photographic optical system 303 of the personal computer 300, and FIG. 14 is a side view of FIG. 12. As it is shown in FIG. 12 to FIG. 14, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed. At a front surface side of the electronic image pickup element chip 162, a cover glass CG is disposed.

An object image received at the electronic image pickup element chip 162 is input to a processing means of the personal computer 300 via a terminal 166. Further, the object image is displayed as an electronic image on the monitor 302. In FIG. 12, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The personal computer includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a personal computer (an image pickup apparatus) having a small size and an improved performance.

Figure 15A:
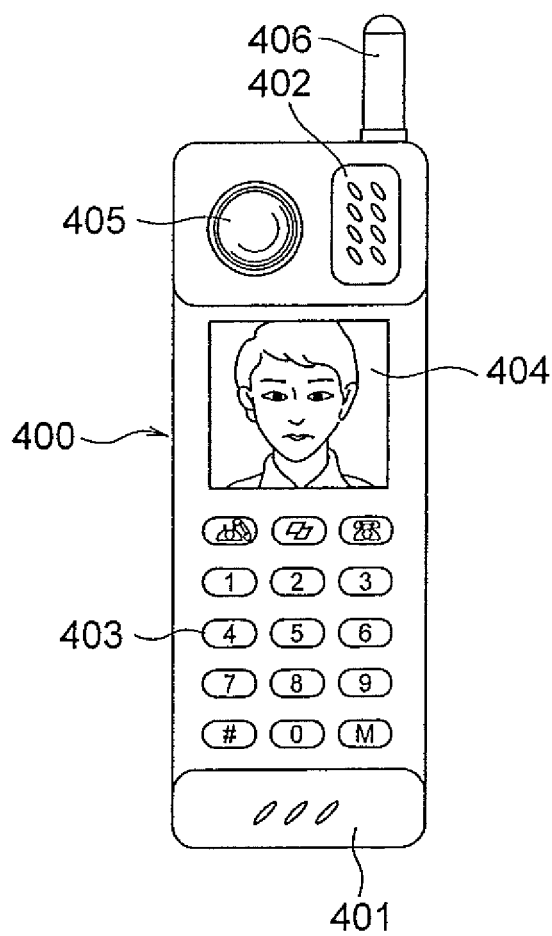
FIGS. 15A, 15B, and 15C show a cellular phone as an example of an information processing apparatus in which a taking optical system according to the present invention is provided as a taking optical system, where
Figure 15B:
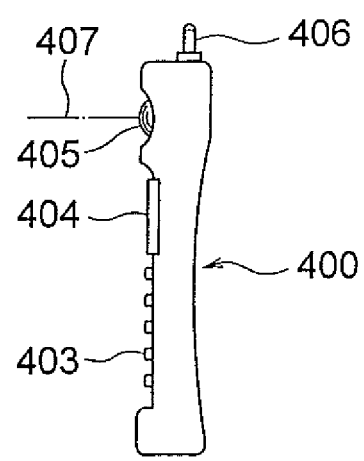
Figure 15C:
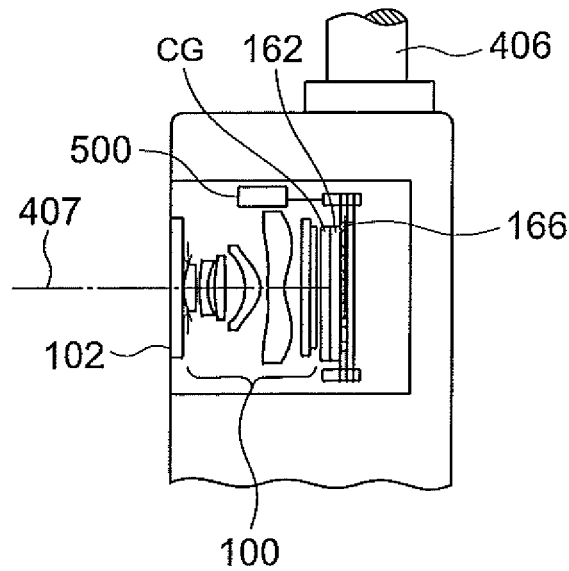

Next, a telephone which is an example of an information processing apparatus in which the image forming optical system of the present invention is built-in as a photographic optical system, particularly a portable telephone which is easy to carry is shown in FIG. 15A, FIG. 15B, and FIG. 15C. FIG. 15A is a front view of a portable telephone 400, FIG. 15B is a side view of the portable telephone 400, and FIG. 15C is a cross-sectional view of a photographic optical system 405. As shown in FIG. 15A to FIG. 15C, the portable telephone 400 includes a microphone section 401, a speaker section 402, an input button 403, a monitor 404, the photographic optical system 405, an antenna 406, and a processing means.

Here, the microphone section 401 is for inputting a voice of the operator as information. The speaker section 402 is for outputting a voice of the communication counterpart. The input button 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The telephone includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a telephone (an image pickup apparatus) having a small size and an improved performance.

Figure 18:
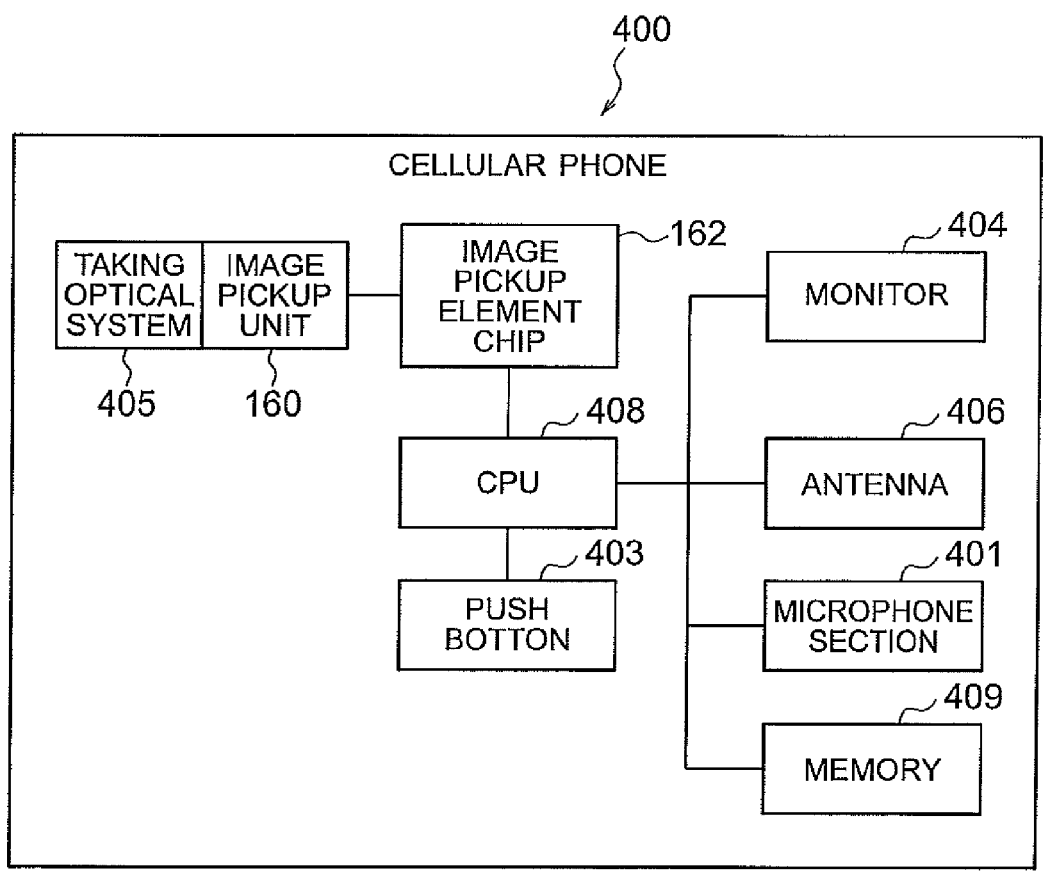
FIG. 18 is a block diagram showing the configuration of a processing section of the cellular phone.

FIG. 18 is a block diagram of the cellular phone 400. In the cellular phone 400, the push button 403 corresponds to the input section 501 of the information processing apparatus 500, the taking optical system 405 and an image pickup unit 160 correspond to the image pickup apparatus 503, the image pickup element chip 162 corresponds to the image processing section 504, the monitor 404 corresponds to the display section 505, the antenna 406 corresponds to the communication section 506, and the microphone section 401 corresponds to the sound obtaining section 507. Furthermore, a CPU 408 corresponds to the processing section 502, and a built-in memory 409 corresponds to the information recording section 508.

The present invention can have various modifications which fairly fall within the basic teaching herein set forth.

As described in the foregoing, the image forming optical system and the image pickup apparatus using the same according to the present invention are useful when the image forming optical system and the image pickup apparatus are required to have excellent performance with reduced ghost images and lens flare while being short in overall optical length.

The image forming optical system and the image pickup apparatus using the same according to the present invention are advantageous in that ghost images and lens flare, which can matter when excellent performance and short overall optical length are to be achieved, can be made small.

What is claimed is:

1. An image forming optical system comprising, in order from the object side, an aperture, a first lens having a positive refractive power, a second lens having a negative refractive power, a third lens having a positive refractive power, a fourth lens having a positive refractive power and having a meniscus shape with a convex surface facing the image side, and a fifth lens having a negative refractive power, and the image forming optical system satisfying the following conditional expression (1):

$$0.55 < \phi s9/\phi s10 < 0.65 \tag{1},$$

where $\phi s9$ is the effective diameter of the fourth lens on its image side, and $\phi s10$ is the effective diameter of the fifth lens on its object side.

2. An image forming optical system according to claim 1, wherein the image forming optical system satisfies the following conditional expression (2):

$$\phi s9 < \phi\text{field} \tag{2},$$

where $\phi s9$ is the effective aperture of the fourth lens on its image side, and $\phi\text{field}$ is the largest image height of the image forming optical system.

3. An image forming optical system according to claim 1, wherein the image forming optical system satisfies the following conditional expression (3):

$$\theta 11 < 40° \tag{3},$$

where $\theta 11$ is the largest value of an angle formed by the optical axis and the normal of the image side surface of the fifth lens over the entire area within the effective aperture.

4. An image forming optical system according to claim 1, wherein the image forming optical system satisfies the following conditional expression (4):

$$0.26 < L123/TTL < 0.294 \tag{4},$$

where L123 is the sum total of the thicknesses of the lenses and the air distances from the object side surface of the first lens to the image side surface of the third lens, and TTL is the total optical length of the image forming optical system.

5. An image forming optical system according to claim 1, wherein the image forming optical system satisfies the following conditional expression (5):

$$-0.6 < r8/f < -0.35 \tag{5},$$

where r8 is the paraxial radius of curvature of the object side surface of the fourth lens, and f is the focal length of the entire image forming optical system.

6. An image forming optical system according to claim 1, wherein the image forming optical system satisfies the following conditional expression (6):

$$0.35 < f1/f3 < 0.48 \tag{6},$$

where f1 is the focal length of the first lens, and f3 is the focal length of the third lens.

7. An image forming optical system according to claim 1, wherein the stop is located closer to the image side than the surface vertex of the first lens.

8. An image forming optical system according to claim 1, wherein the first lens, the second lens, the third lens, the fourth lens, and the fifth lens are made of a resin.

9. An image pickup apparatus comprising an image forming optical system according to claim 1 and an auto-focusing mechanism that are integrated together.

10. An image pickup apparatus comprising an image forming optical system according to claim 1 and an image pickup element that are integrated together.

11. An information processing apparatus comprising:
an input section used to operate the information processing apparatus;
a processing section that processes at least information from the input section;
an image pickup apparatus that obtains image information based on information from the processing section;
an image processing section that processes the image information obtained by the image pickup apparatus; and
a display section that displays the processed image,
wherein the image pickup apparatus is an image pickup apparatus according to claim 10.

12. An information processing apparatus according to claim 11, wherein the information processing apparatus further comprises a communication section and can transmit image information obtained by the image pickup apparatus.

13. An information processing apparatus according to claim 12, wherein the information processing apparatus further comprises a sound obtaining section and an information recording section.

14. An information processing apparatus according to claim 13, wherein the information processing apparatus is portable electronic equipment.

* * * * *

UNITED STATES PATENT AND TRADEMARK OFFICE
CERTIFICATE OF CORRECTION

PATENT NO. : 8,913,155 B2
APPLICATION NO. : 13/646998
DATED : December 16, 2014
INVENTOR(S) : Takuya Otsu It is certified that error appears in the above-identified patent and that said Letters Patent is hereby corrected as shown below:

In the Specification at column 1, line 27, change "element" to "elements";
at column 1, line 30, change "meets" to "meet";
at column 1, line 38, change "having" to "have";
at column 4, line 25, change "across sectional" to "a cross-sectional";
at column 8, line 35, change "/" to "]";
at column 8, line 36, after "$A_{12}y^{12}$" add "..."; and
at column 8, line 37, change "e indicates '$10^{-n}$'" to "e-n indicates '$\times 10^{-n}$'".

Signed and Sealed this
Thirtieth Day of June, 2015

Michelle K. Lee
*Director of the United States Patent and Trademark Office*